United States Patent [19]

Schlagmüller et al.

[11] 4,295,554
[45] Oct. 20, 1981

[54] CENTRIFUGAL FRICTIONAL CLUTCH

[75] Inventors: Walter Schlagmüller, Schwieberdingen; Rudolf Babitzka, Kirchberg, both of Fed. Rep. of Germany

[73] Assignee: Robert Bosch GmbH, Stuttgart, Fed. Rep. of Germany

[21] Appl. No.: 67,163

[22] Filed: Aug. 16, 1979

[30] Foreign Application Priority Data

Aug. 31, 1978 [DE] Fed. Rep. of Germany ....... 2837922
Jul. 10, 1979 [DE] Fed. Rep. of Germany ....... 2927730

[51] Int. Cl.$^3$ .............................................. F16D 43/14
[52] U.S. Cl. ............................ 192/105 CE; 192/48.3; 192/107 M
[58] Field of Search ........ 192/103 B, 104 B, 105 CD, 192/105 CE, 45.1, 48.1, 48.3, 107 R, 107 M

[56] References Cited

U.S. PATENT DOCUMENTS

| | | | |
|---|---|---|---|
| 698,112 | 4/1902 | Hall | 192/107 R |
| 1,855,643 | 4/1932 | Matthews | 192/105 C |
| 2,168,856 | 8/1939 | Banker | 192/105 CE |
| 2,375,909 | 5/1945 | Fawick | 192/105 CD |
| 2,911,962 | 11/1959 | McRae | 192/104 B |
| 2,970,680 | 2/1961 | Cain | 192/105 CD |

FOREIGN PATENT DOCUMENTS 268379 7/1927 United Kingdom ............ 192/104 B

Primary Examiner—George H. Krizmanich
Attorney, Agent, or Firm—Michael J. Striker

[57] ABSTRACT

A centrifugal frictional clutch is constituted by a rotary housing supporting for rotation a weight lever actuated by the centrifugal force and being biased by a spring against the latter. The weight lever pivotably supports a coupling jaw which cooperates with a frictional surface of a coupling disk. The resultant normal frictional force $F_N$ forms with the line connecting pivot points of the jaw and of the lever a design angle $\gamma$ which corresponds to the angle of the static friction. The biasing spring, the jaw and the weight lever are arranged within the range of the coupling disk. Preferably, the clutch includes an additional disk having a smaller diameter and coupled via a free-wheel coupling to the first coupling disk to act as a double speed clutch.

16 Claims, 6 Drawing Figures

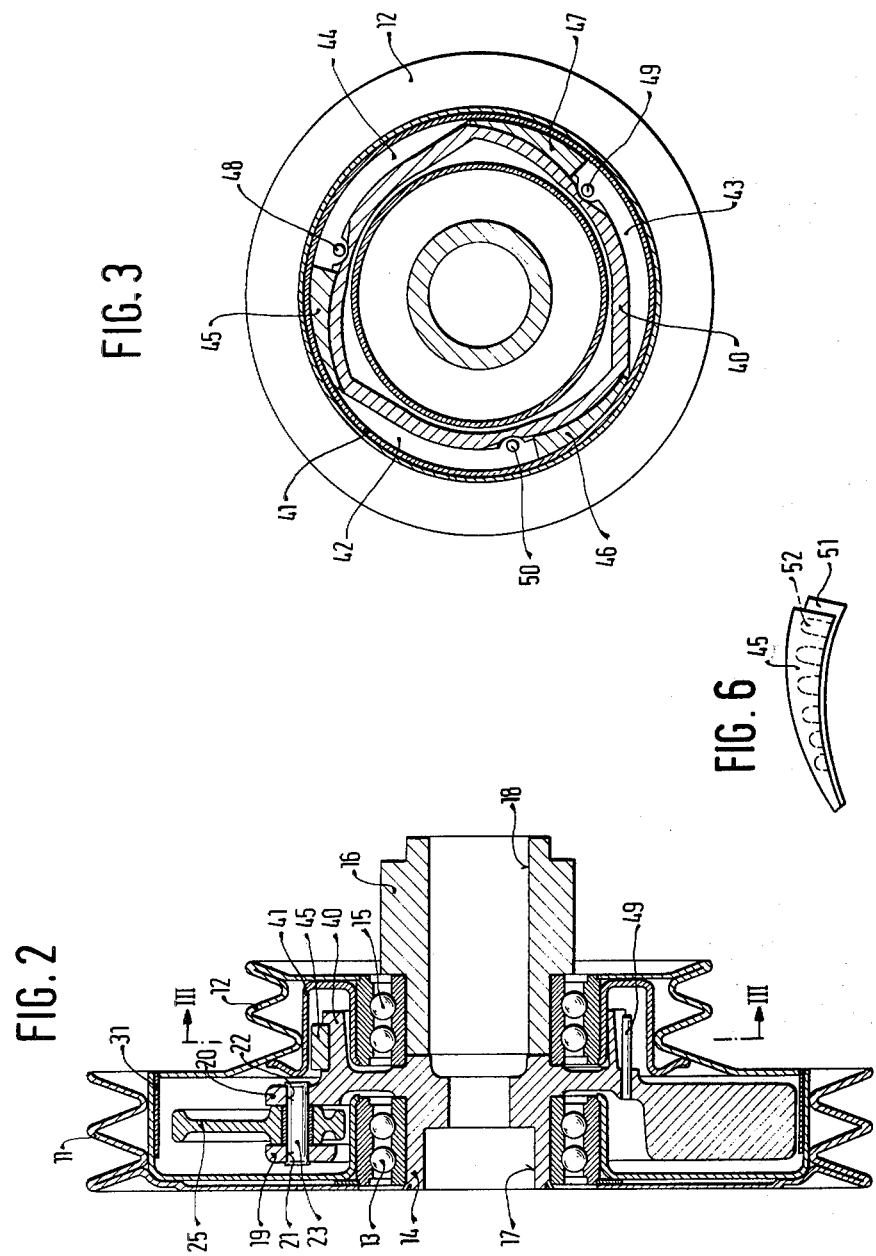

CENTRIFUGAL FRICTIONAL CLUTCH

BACKGROUND OF THE INVENTION

This invention relates generally to centrifugal clutches, and more particularly it relates to a centrifugal frictional clutch of the type which is actuated by a swing lever acting as a centrifugal weight rotatable about an axle arranged on the housing of the clutch, the lever cooperating with a spring acting against the direction of the centrifugal force, and supporting for rotation a coupling jaw which is normally pressed against a frictional ring surface on a rotatable clutch disk and disengaged from the latter when the force of the spring is overcome by the centrifugal force.

In conventional centrifugal clutches of this type the centrifugal weight lever, the frictional surfaces and the coupling jaw are arranged outside the clutch disk and, consequently, an excessively spacious structure of the clutch results.

SUMMARY OF THE INVENTION

A general object of the present invention is to overcome the aforementioned disadvantages.

More particularly, it is an object of the invention to provide an improved centrifugal clutch which has a compact structure occupying a small space and consequently is particularly suitable for being installed in a motor vehicle where its installation space is defined only by the size of the drive wheel normally present in the vehicle.

In keeping with these objects, and others which will become apparent hereafter, one feature of the invention resides in a centrifugal frictional clutch of the abovedescribed type, in the arrangement of the pivot axle of the swing lever and of the pivot axle of the coupling jaw on a straight line which forms with the resultant line of the normal force of the jaw against the frictional surface an angle which substantially corresponds to the angle of friction between the jaw and the frictional surface.

The swing lever together with the coupling jaw and the spring is arranged inside the clutch disk.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawings.

BRIEF DESCRIPTION OF THE DRAWINGS

FIG. 2 is a sectional side view of the clutch of FIG. 1 taken along the line II—II;

FIG. 3 is a sectional side view of the clutch of FIG. 2 taken along the line III—III;

FIG. 6 is a fragmentary detail view of another embodiment of the invention.

DESCRIPTION OF THE PREFERRED EMBODIMENTS

Figure 1:
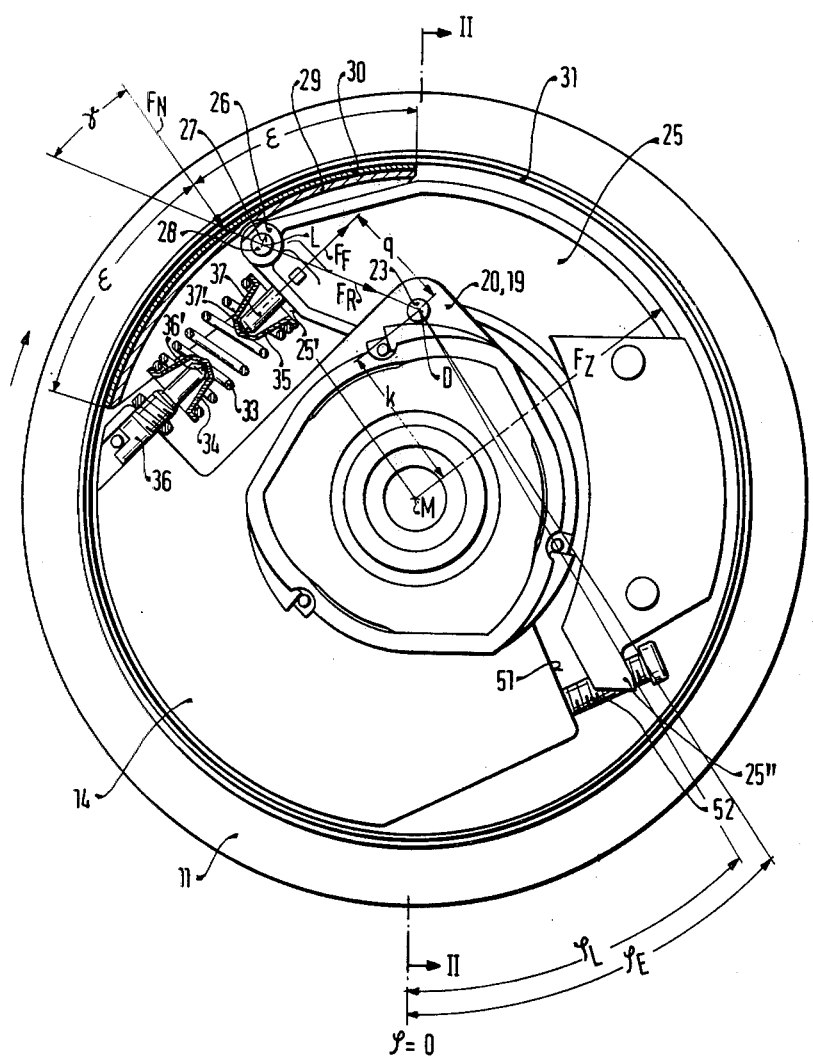
FIG. 1 is an elevational view of the centrifugal frictional clutch of this invention.

The centrifugal frictional clutch of this invention is constructed as a two-speed drive unit constituted of a clutch disk 11 and of a drive or connecting disk 12 the diameter of which is substantially smaller than that of the clutch disk 11. The clutch disk 11 is supported for rotation via a double ball bearing 13 on a clutch housing 14 whereas the connecting disk 12 is supported for rotation also via a double ball bearing 15 on a hub 16. The clutch housing 14 has a stepped axial bore 17 which is in alignment with the bore 18 of the hub 16. The two parts, namely the housing 14 and the hub 16, are arranged for joint rotation on a driving shaft (not illustrated) of a driving motor. The rotary clutch housing 14 is formed on its periphery with two facing arms 19 and 20 provided with aligned bores 21 and 22 for receiving end portions of an axle 23 upon which a lever 25 is rotatably supported. The lever 25 has an arcuate shape extending within the range of the clutch disk approximately about half of its circumference and acts as a centrifugal weight which controls the clutch by the effect of centrifugal force.

At the free end of the lever 25 there are formed lugs 26 each having a bore 27 in which an axle 28 is firmly fitted. The axle 28 swingably supports a coupling jaw 29 provided on its upper surface with a friction lining 30. The coupling jaw has the shape of a circular segment and extends approximately about a quarter of the circumference of the clutch disk 11. The friction lining 30 cooperates with a friction surface 31 formed by the inner wall of the rim of the cup-shaped clutch disk 11. The resultant normal line of frictional force $F_N$ intersects the center point M on the clutch disk 11. The center point L of axle 27 at the free end of lever 25 is offset a little to the right from the line of action of this force $F_N$. An imaginary connection line between the center point L of axle 27 and the center point D of axle 23 forms an angle $\gamma$ which will be termed the "design angle". A pressure spring 33 is arranged on the clutch housing 14 to act against the swing lever 25 in the direction oppossing the centrifugal force. The ends of the spring 33 rest on two cup-shaped spring plates 34 and 35. The spring plate 34 rests on the tip 36' of a setting screw 36 which engages a threaded hole in the clutch housing 14. The opposite spring plate 35 rests on the tip 37' of a bolt 37 which is mounted on the end surface 25' of the lever 25 slightly below the lug 26. The distance between the resultant line of action of the spring force $F_F$ and the center point D of axle 23 is designated by 2. The resultant centrifugal force acting on the lever 25 is designated by $F_Z$. The latter force $F_Z$ acts on an effective lever arm k with respect to the center point D of axle 23. The force of action taking place in the direction of the connection lines between the points L and D is designated by $F_R$ and forms with the resultant normal force $F_N$ of friction the aforementioned design angle $\gamma$.

The clutch housing 14 is further formed with a tubular boss 40 projecting axially toward the connection disk 12. The tubular boss 40 has a polygonal cross-section (FIG. 3) and is surrounded by a cylindrical jacket 41 to which the connection disk 12 is secured by welding or soldering. The three sickle-shaped spaces 42, 43 and 44 resulting between the approximately triangular boss 40 and the cylindrical jacket 41 accommodate respectively a plurality of locking wedges 45, 46 and 47 arranged side-by-side in each space. The wedges are movable in both circumferential directions and in a certain limit position the larger end surface of the wedges abuts against stop pins 48–50. The inner wall of the annular jacket 41 forms a frictional and guiding surface for the adjoining surface of respective wedges 45–47.

The part of housing 14 which is diametrically opposed to the setting screw 36 is formed with an end surface 51 provided with a screw 52 which serves as the limit stop for the lever 25 or for a centrifugal weight formed on this lever. In a modification, the end of lever 25 is shaped into a nose 25″ which receives the setting screw.

Figure 4:
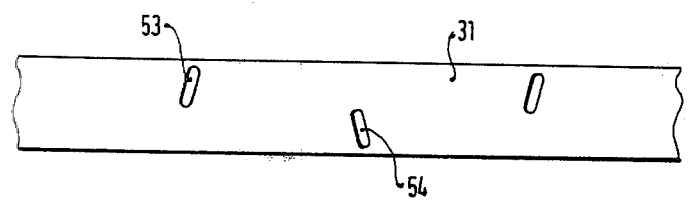
FIG. 4 is an elevational view of a part of the clutch of FIG. 1.

As seen from FIG. 4, the friction surface 31 of disk 11 is formed with two rows of elongated openings 53 and 54 extending respectively over a half of the width of the friction surface of the rim and being inclined relative to the axis of rotation of the latter whereby the longer axes of openings in respective rows converge relative to each other.

A two speed centrifugal frictional clutch provided with a free wheel coupling and a connection disk is used with advantage in auxiliary units of a motor vehicle. At low rotational speeds of the motor the drive takes place via the coupling disk 11 when the clutch is engaged, that means the pressure force of spring 33 is larger than the counteracting centrifugal force of the lever 25 and consequently the clutch jaw 29 with its frictional lining 30 is pressed against the frictional surface 31 of the rim of the disk 11. At the same time, the connecting disk 12 is disengaged; that means the locking wedges 45–47 are compressed against the stop pins 48–50 so that no frictional engagement between the wedges and the annular boss 41 takes place. At higher rotational speeds for example over 2000 rotations per minute, the centrifugal force increases to such an extent that the lever 25 is turned about the pivot point D and compresses the spring 33 so that the coupling jaw is displaced from the friction surface 31. As a result, the centrifugal frictional clutch is disengaged, the locking wedges 45–47 are moved into the sickle-like gap in the spaces 42–44 and a frictional contact between the annular jacket 41 and the boss 40 is established so that the connecting disk 12 is in engagement with the rotary housing 14. As a result, the auxiliary units in the vehicle are now driven via the connecting disk 12.

The clutch according to this invention is designed in such a manner as to be shifted when the rotary moment of forces acting on the lever 25, namely of the spring force $F_F$, centrifugal force $F_Z$ and the resultant frictional force $F_R$ are brought from a balanced condition about the pivot point D into an unbalance. By virtue of the particular configuration and mutual arrangement of the lever 25 and of the coupling jaw 29 it is attained that the frictional force amplifies itself. The amplification factor $$a = \frac{1}{1 - tg\rho \cdot cotg\gamma}$$

depends on the geometric arrangement of the lever 25 and of the jaw 29, namely on the design angle $\gamma$ and the frictional coefficient $\rho$ (the angle of friction) between the frictional lining 30 and the frictional surface 31. The clutch of this invention is subject to the following requirements: (1) the disengagement should take place with zero or negligible slippage, (2) the engagement should occur without any disturbing jerk, and (3) no prolongated slippage should take place during the engagement of the clutch.

The first requirement is met by the design angle $\gamma = \rho_s$, wherein $\rho_s$ is the angle of friction at the static friction.

For the engagement of the clutch the following equation results:

$$F_u = a_d \cdot F_o \cdot tg\rho_d$$

wherein $\rho_d$ equals the angle of friction at dynamic friction, $a_d$ equals the amplification factor at dynamic friction and $F_o$ is the force applied by the friction lining 30 to the friction surface 31 during the engagement of the clutch.

At given angles $\gamma$ and $\rho_d$ the second requirement can be met by setting the force $F_o$. The force $F_o$ during the engagement of the clutch depends on the shifting hysteresis and this hysteresis is determined by the arrangement of the spring 33 and by the design angle $\rho$ of the lever 25.

Figure 5:
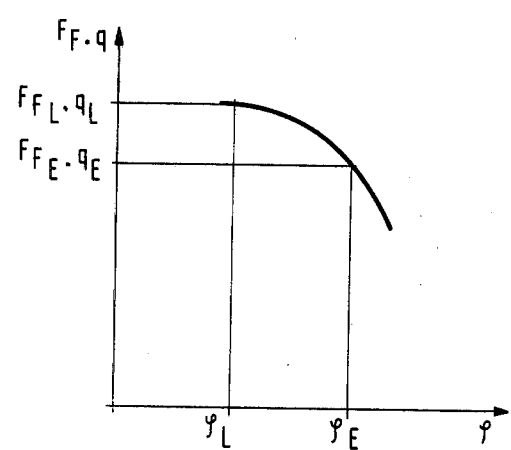
FIG. 5 is a plot diagram of forces acting in the clutch of this invention.

The clutch is shifted into engagement when the rotary moments of the aforementioned forces acting on the lever 25 change from a balanced condition about the pivot point D into an unbalanced condition. For the sake of simplification the bearing frictions and acceleration forces are omitted. The release takes place when $$F_{FL} \cdot q_L < F_{ZL} \cdot K_L$$

and the engagement takes place when $$F_{FE} \cdot q_E < F_{ZE} \cdot K_E$$

as illustrated in the plot diagram in FIG. 5.

By selecting the arrangement and the structure of the spring 33 one obtains $$F_{FL} \cdot q_L < F_{FE} \cdot q_E$$

The shifting hysteresis and the application force $F_O$ of the coupling jaw during its engagement results, in view of the above equation, in $$F_o = \frac{F_{FL} \cdot q_L - F_{FE} \cdot q_E}{\overline{AD} \cdot \sin\gamma}$$

The transmittable circumferential force $F_{UE}$ occurring during engagement can, therefore, be adjusted during the installation of the clutch by limiting the angle of swing $\gamma$ of the lever 25 setting the stop screw 52.

The bearing support for the spring 33 is so designed that the pivot points 36′ and 37′ of the two spring plates are situated within the spring 33 and are spaced from one another approximately one-third of the length of the spring. Due to this arrangement it is assured that the function plotted in the diagram in FIG. 5 results in a flat range about $\rho = O = \rho_L$, (i.e. a constant rotational speed for the release even in case of wear of the friction lining) and an abruptly dropping branch at $\rho = \rho_E$ (the required shifting hysteresis at a small angle of swing of the lever 25). The inwardly directed bearing support for the spring which is carried out as a knife edge support has an additional advantage in the reduced friction and a high resistance against buckling. The moment of the spring force in the release condition is smaller than in the engaged condition.

The clearance between the points A–L is to be as small as possible so that upon the wear of the friction lining the change of the design angle $\rho$ remains minimum.

To assure proper operation of the free wheel coupling the coefficient of friction between the elements 45–47 and the hub 40 must be smaller than the similar coefficient between the elements 45–47 and the mines surface 41'. If this is the case, then disengagement of the centrifugal clutch will result in reliable shifting of the elements 45–47 into the spaces 42–44. The necessary differentiation in the frictional coefficients can be obtained by e.g., placing a dry lubricant between the elements 45–47 and the surface of hub 40, for example on the undersurface of the elements 45–47 or on the hub surface which faces these elements.

Another possibility of reducing the coefficient of friction is to provide a glide member 61 as shown in FIG. 6, e.g., a sheet-metal member provided with a coating of polytetrafluoroethylene.

The elements 45–47 are advantageously made of synthetic plastic material which may be provided with honeycomb recesses or voids to reduce the weight of the elements. Such parts can be produced especially simply, require no heat-treatments as do analogous elements in known free wheeling devices, and are very light so that wear is further reduced.

It will be understood that each of the elements described above, or two or more together, may also find a useful application in other types of constructions differing from the types described above.

While the invention has been illustrated and described as embodied in a centrifugal frictional clutch, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A centrifugal frictional clutch including a housing rotatable about a first axis; a frictional member arranged about said housing concentrically with said first axis; a weight lever rotatably supported on said housing to rotate in response to a centrifugal force about a second axis radially spaced apart from said first axis; spring means supported on said housing to act on said lever against the direction of the centrifugal force; a coupling jaw rotatably supported on said weight lever for rotation about a third axis and being engageable with said frictional member, said second and third axes defining a connection line forming with the resultant normal line of action of the force of friction between said jaw and said frictional member an angle $\gamma$ which corresponds to the angle of static friction between said jaw and said frictional member.

2. The clutch as defined in claim 1, wherein said frictional member includes a coupling disk having a rim, the inner wall of said rim defining a frictional surface; and said lever, said coupling jaw and said spring means include a sprung arranged within the range of said rim.

3. The clutch as defined in claim 1, wherein said coupling jaw has the shape of a circle segment hinged to one arm of said lever for rotation about a point L which lies on the connection line between the point of attach A of the resultant frictional force $F_R$ in the center of the coupling jaw and the pivot point D of said lever.

4. The clutch as defined in claim 3, wherein the distance between the points A and L is smaller than a quarter of the distance between the points A and D.

5. The clutch as defined in claim 1, wherein said lever is provided with means for adjusting the swing angle of said lever relative to said housing.

6. The clutch as defined in claim 5, wherein said adjusting means is a setting screw arranged between said lever and said housing.

7. The clutch as defined in claim 1, wherein said spring means includes a spring, support means for said spring, said support means including spring plates engaging respective ends of said spring, and support screws mounted respectively on said housing and said lever and having knife edge tips for engaging said spring plates.

8. The clutch as defined in claim 7, wherein said spring plates have a cup-shaped configuration and said supporting screws projecting into the range of said spring.

9. The clutch as defined in claim 2, further including an additional coupling disk rotatable about said first axis, a free-wheel coupling between said additional coupling disk and said housing to form together with said first-mentioned coupling disk a two-speed clutch unit.

10. The clutch as defined in claim 9, wherein said free-wheel coupling includes a boss formed on said housing and a cylindrical jacket supported for rotation about said first axis and around said boss, said boss having an angular cross-section to form with said cylindrical jacket a plurality of converging interspaces, and a plurality of wedge-like members disposed for limited movement in said interspaces to engage and alternatively disengage said additional coupling disk from said housing.

11. The clutch as defined in claim 2, wherein said frictional surface has a plurality of elongated openings arranged in two parallel rows and being slightly inclined relative to said first axis, the direction of inclination of said openings in one row converging to the direction of inclination of said openings in the other row.

12. The clutch as defined in claim 10, wherein the coefficient of friction between said wedge-like members and said additional disk is greater than the coefficient of friction between said wedge-like members and said housing.

13. The clutch as defined in claim 12, wherein a dry lubricant means is confined between said wedge-like members and said housing.

14. The clutch as defined in claim 13, said dry lubricant means comprising a sheet-material member provided with a coating of polytetrafluoroethylene.

15. The clutch as defined in claim 12, said wedge-like members being of synthetic plastic material and of honeycomb shape.

16. The clutch as defined in claim 12, wherein there are three of said wedge-like members provided.

* * * * *